United States Patent
Guey

(10) Patent No.: US 6,594,793 B1
(45) Date of Patent: Jul. 15, 2003

(54) METHODS AND SYSTEMS FOR MULTIPLEXING AND DECODING VARIABLE LENGTH MESSAGES IN DIGITAL COMMUNICATIONS SYSTEMS

(75) Inventor: Jiann-Ching Guey, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 399 days.

(21) Appl. No.: 09/659,021

(22) Filed: Sep. 8, 2000

(51) Int. Cl.[7] .................. H03M 13/00; G06F 11/00
(52) U.S. Cl. .................. 714/776; 714/758; 714/799
(58) Field of Search .................. 714/776, 746, 714/758, 799

(56) References Cited

U.S. PATENT DOCUMENTS

| | | | | |
|---|---|---|---|---|
| 5,548,598 A | * | 8/1996 | Dupont | 714/751 |
| 5,774,496 A | * | 6/1998 | Butler et al. | 375/225 |
| 5,818,852 A | * | 10/1998 | Kapoor | 714/749 |
| 5,844,918 A | * | 12/1998 | Kato | 714/751 |
| 5,905,733 A | | 5/1999 | Sölve et al. | 370/522 |
| 5,943,328 A | * | 8/1999 | Hosford | 370/331 |
| 5,946,346 A | * | 8/1999 | Ahmed et al. | 375/219 |
| 6,035,222 A | * | 3/2000 | Yoshida et al. | 455/574 |
| 6,061,820 A | * | 5/2000 | Nakakita et al. | 714/751 |
| 6,084,888 A | * | 7/2000 | Watanabe et al. | 370/473 |
| 6,094,465 A | * | 7/2000 | Stein et al. | 375/346 |
| 6,148,422 A | * | 11/2000 | Strawczynski et al. | 714/704 |
| 6,170,073 B1 | * | 1/2001 | Jarvinen et al. | 714/758 |
| 6,212,203 B1 | * | 4/2001 | Anderson et al. | 370/473 |
| 6,233,709 B1 | * | 5/2001 | Zhang et al. | 714/774 |
| 6,320,919 B1 | * | 11/2001 | Khayrallah et al. | 375/347 |
| 6,363,257 B1 | * | 3/2002 | Warwick | 455/511 |
| 6,366,624 B1 | * | 4/2002 | Balachandran et al. | 375/341 |
| 6,480,475 B1 | * | 11/2002 | Modlin et al. | 370/294 |

FOREIGN PATENT DOCUMENTS

| | | | |
|---|---|---|---|
| WO | WO 95/01032 | 1/1995 | |
| WO | 98/21847 | 5/1998 | H04J/7/00 |

OTHER PUBLICATIONS

U.S. patent application for *Rate Detection Apparatus and Method for Variable Rate Speech Encoding*, filed Apr. 27, 1999, Application Ser. No. 09/300,184; Field: Apr. 27, 1999.
*Physical Layer Standard for cdma2000 Spread Spectrum Systems*, TIA/EIA/IS–2000–2, Dec. 15, 1999, which incorporates materials from prior revisions of the standard that were publicly available more than one year prior to the filing date of this application.
*Physical Layer Standard for cdma2000 Spread Spectrum Systems*, TIA/EIA/IS–2000–3A, which incorporates materials from prior revisions of the standard that were publicly available more than one year prior to the filing date of this application.
Search Report for PCT/US01/26153 dated May 6, 2002.

* cited by examiner

Primary Examiner—Albert Decady
Assistant Examiner—Anthony T. Whittington
(74) Attorney, Agent, or Firm—Myers Bigel Sibley & Sajovec

(57) ABSTRACT

Methods and systems are provided by which a terminal may decode a received data frame of a first length which includes an embedded control frame of a second length. Pursuant to one embodiment of these methods and systems, the terminal receives a data frame, and then examines at least part of this data frame to determine if it includes an embedded control frame. If an embedded control frame is detected, the terminal replaces that portion of the received data frame that corresponds to the embedded control frame with a dummy data sequence to provide a modified data frame, which is then decoded. If an embedded control frame is not detected, the terminal may decode the received data frame without modification.

42 Claims, 9 Drawing Sheets

METHODS AND SYSTEMS FOR MULTIPLEXING AND DECODING VARIABLE LENGTH MESSAGES IN DIGITAL COMMUNICATIONS SYSTEMS

BACKGROUND OF THE INVENTION

The present invention relates to digital communications and, in particular, to methods and systems for processing variable length messages.

In a wide variety of digital communication systems, the data (e.g., voice, facsimile, e-mail messages, computer files, etc.) that is transmitted via the communications link and/or network is configured into data frames prior to transmission. Data frames that are transmitted over the system may include part or all of a particular message, and the data frames transmitted by a particular terminal during a particular communication may be of the same length. Digital communications protocols which incorporate such a frame structure may operate under a variety of different multiple access techniques, specifically including frequency division multiple access ("FDMA"), time division multiple access ("TDMA") and code division multiple access ("CDMA") techniques, or combinations thereof.

In various communications systems which transmit messages via the use of data frames, control messages are also sent over the regular communications channel. These control messages are configured into "control frames" that are inserted into the stream of data frames that is transmitted over the channel. This may be done, for example, by replacing all or part of a data frame with one or more control frames that contain control message(s). When such replacement is performed, the regular communications frame which is replaced by the control frame(s) may be (i) delayed and transmitted immediately after the control frames or (ii) queued and retransmitted at a later time. However, with real time communications, such as voice communications, the delay and queuing options may not be desirable, in which case the regular communications frame(s) that was replaced by control frame(s) may be discarded.

An example of a wireless communications system that interrupts the flow of regular communications traffic to send control messages are systems that operate under the IS-2000 air interface. The IS-2000 interface is described in the publication entitled "Physical Layer Standard for cdma2000 Spread Spectrum Systems", the disclosure of which is incorporated by reference herein. Pursuant to the IS-2000 air interface, voice and data traffic are carried over the fundamental channel via a steady stream of 20 millisecond data frames. Periodically, this stream of 20 millisecond data frames is interrupted so that 5 millisecond control message bursts ("control frames") may be transmitted that are used for maintaining the communications link. Under the IS-2000 standard, a control frame is sent at one of the 5 millisecond boundaries that divides a 20 millisecond data frame into four equal sub-intervals. Both the 20 millisecond data frames and the 5 millisecond control frames have cyclic redundancy check ("CRC") bits for error detection and are convolutionally encoded before transmission. Thus, for example, a 20 millisecond frame might contain 176 data bits and 16 CRC bits (192 total bits), which are then encoded using a rate ½ convolutional encoder to result in a frame having 384 bits (2×192) that is transmitted over the IS-2000 fundamental channel.

SUMMARY OF THE INVENTION

In embodiments of the present invention, methods and systems are provided by which a terminal may decode a received data frame of a first length which includes an embedded control frame of a second length. Pursuant to one embodiment of these methods and systems, the terminal receives a data frame, and then examines at least part of this data frame to determine if it includes an embedded control frame. If an embedded control frame is detected, the terminal replaces that portion of the received data frame that corresponds to the embedded control frame with a dummy data sequence to provide a modified data frame, which is then decoded. If an embedded control frame is not detected, the terminal may decode the received data frame without modification.

Pursuant to other embodiments of the present invention, a receiver determines the length of a data frame within a burst and a transmitter integrates a control message into a data stream. Additionally, in yet other embodiments of the present invention communications terminals and systems for receiving/decoding data frames which include embedded control frames are provided.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by those of skill in the art, the present invention may be embodied as methods or systems. Accordingly, aspects of the present invention may take the form of a hardware embodiment, a software embodiment or an embodiment combining software and hardware.

Figure 1:
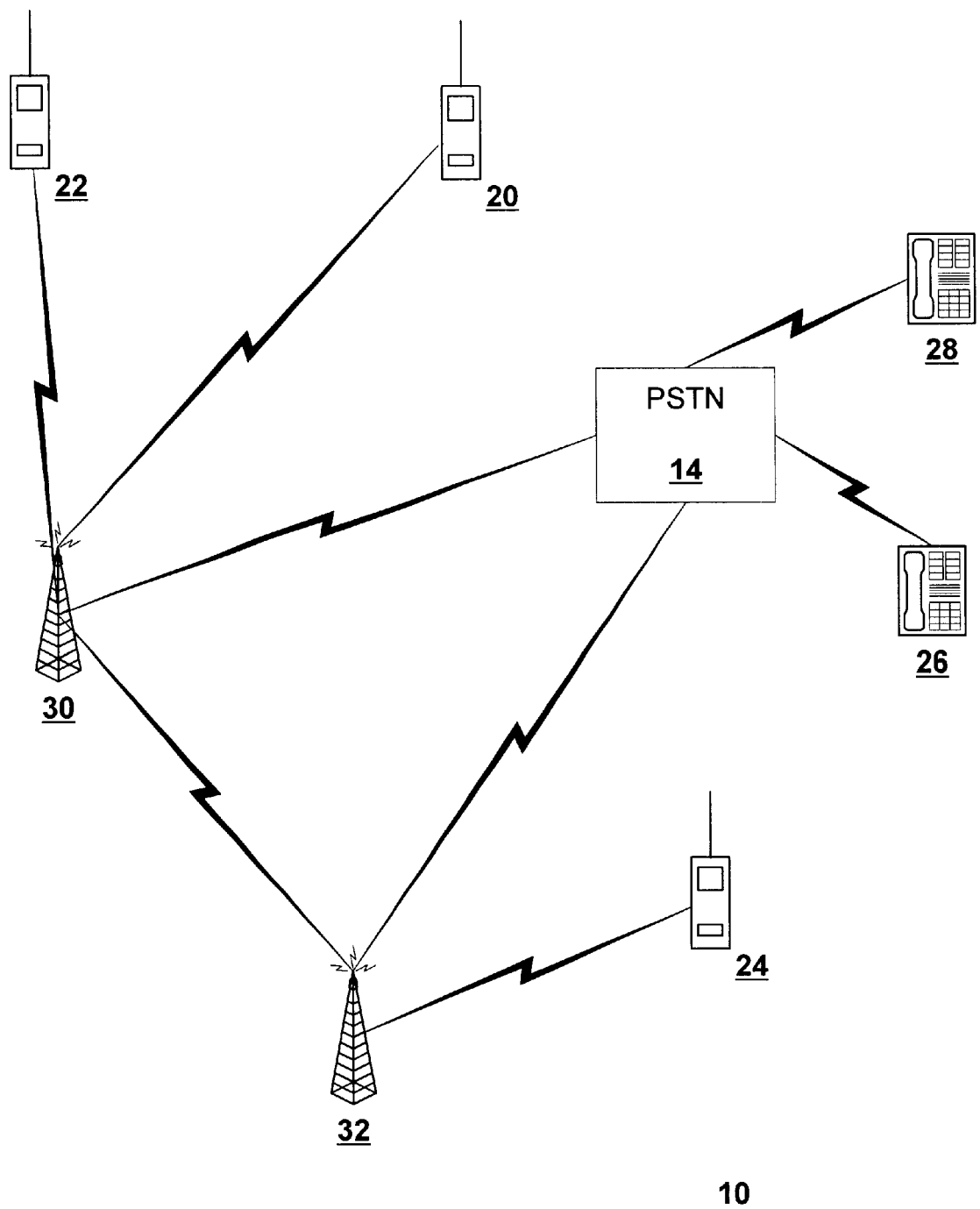
FIG. 1 is a diagram depicting a wireless communications network in which embodiments of systems and methods of the present invention may be implemented.

FIG. 1 depicts a wireless communications system 10 in which the methods and systems of the present invention may be used. As indicated in FIG. 1, a plurality of wireless terminals 20, 22, 24 communicate with each other and other terminals, such as terminals 26, 28 via a cellular telephone network and the public service telephone network ("PSTN") 14. Wireless terminals 20, 22, 24 might comprise, for example, wireless cellular telephones. In the cellular telephone network a plurality of base stations 30, 32 are provided. These base stations 30, 32 provide wireless communications links between each other and the wireless terminals 20, 22, 24 in their geographic area to allow for communications between the various wireless terminals 20, 22, 24 and the terminals 26, 28 in the PSTN 14. While FIG. 1 depicts an examplary wireless communications system in which the methods and systems of the present invention may be used, it will be appreciated that the methods and systems disclosed herein may also be used in hard-wired digital communications systems.

Figure 2:
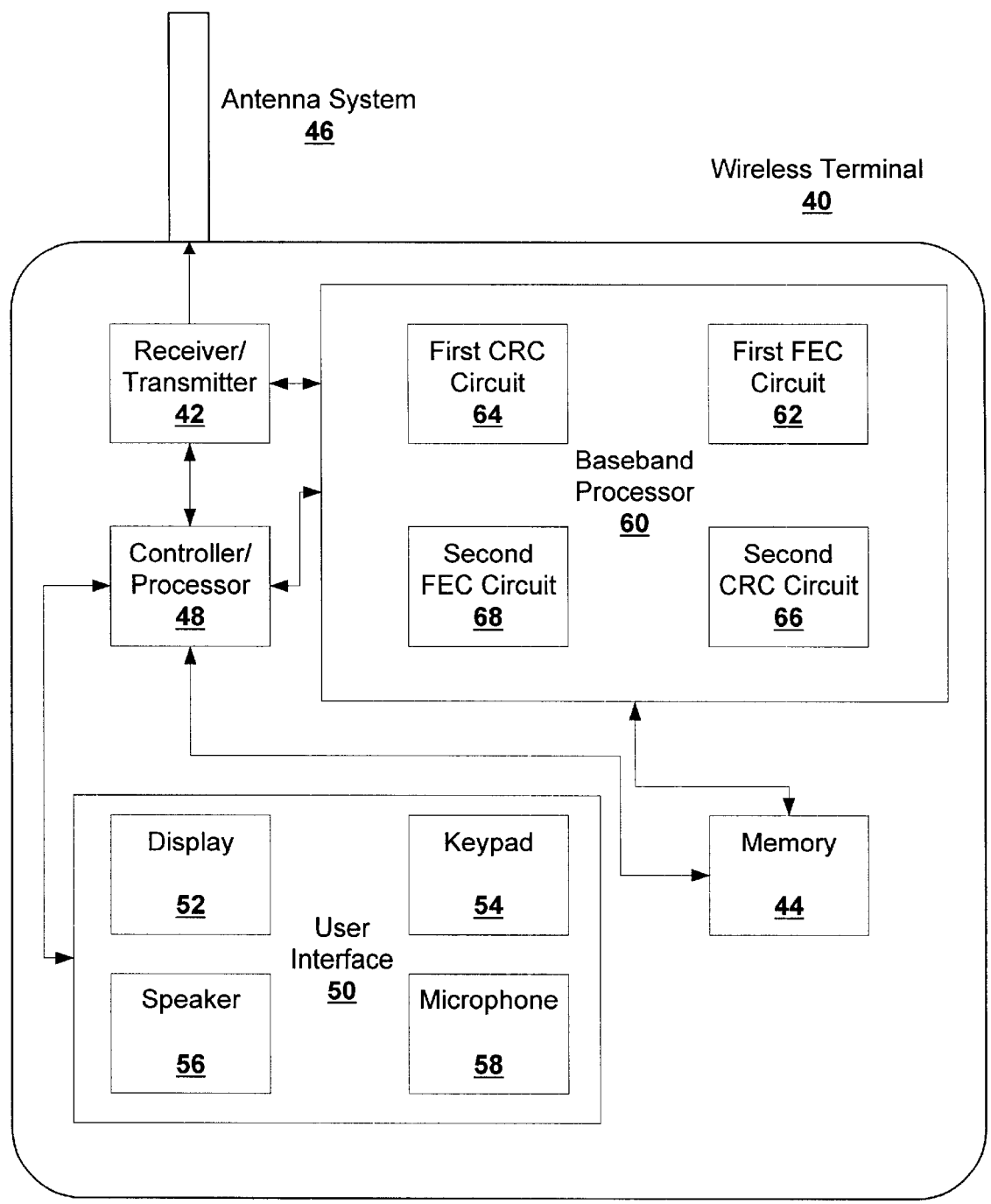
FIG. 2 is a block diagram illustrating a wireless terminal according to embodiments of the present invention.

FIG. 2 is a block diagram illustration which depicts a wireless terminal 40 according to embodiments of the present invention. As illustrated in FIG. 2, the wireless terminal 40 may include a transmitter/receiver or "transceiver" 42 that is operative to transmit and receive RF communication signals via an antenna system 46 under control of a controller/processor 48. The antenna system may include an antenna feed structure and one or more antennas. The transceiver 42 or the controller/processor 48 may include communications circuitry, such as an RF processor, configured to step up signals for transmission to an assigned transmission frequency or to step down received signals from a modulation frequency to a baseband frequency.

The wireless terminal 40 may also include a baseband processor 60. The baseband processor may include components such as interleavers/deinterleavers, encryption/decryption circuitry, voice encoders/decoders, modulators/demodulators, spread spectrum coders/decoders and/or other digital signal processing circuitry.

It will be appreciated that the transceiver 42, the controller/processor 48, the baseband processor 60 and other components of the wireless terminal 40 may be implemented using a variety of hardware and software. For example, operations of the transceiver 42, the controller/processor 48 and/or the baseband processor 60 may be implemented using special-purpose hardware, such as an application specific integrated circuit (ASIC) and programmable logic devices such as gate arrays, and/or software or firmware running on a computing device such as a microprocessor, microcontroller or digital signal processor (DSP). It will also be appreciated that the functions of the transceiver 42, the controller/processor 48, the baseband processor 60 or other components of the wireless terminal may be integrated in a single device, such as a single ASIC microprocessor or microcontroller or may be distributed among several devices.

The controller/processor 48 processes messages in conjunction with the baseband processor 60 to produce physical layer bursts that are transmitted over wireless channels by the transceiver 42 via the antenna system 46. The controller/processor 48, such as a microprocessor, microcontroller or similar data processing device, may execute program instructions stored in a memory 44 of the wireless terminal 40, such as a dynamic random access memory (DRAM), electrically erasable programmable read-only memory (EEPROM) or other storage device.

The controller/processor 48 is further operatively associated with a user interface 50. The user interface 50 may include a variety of components, such as a display 52, a keypad 54, a speaker 56, and a microphone 50, operations of which are known to those of skill in the art and will not be further discussed herein.

As is well known to those of skill in the art, the transmitter portion of the transceiver 42 or the baseband processor 60 converts the information which is to be transmitted by the wireless terminal 40 into an electromagnetic signal suitable for radio communications. The receiver portion of the transceiver 42 or the baseband processor 60 demodulates electromagnetic signals which are received by the wireless terminal 40 so as to provide the information contained in the signals to the user interface 50 in a format which is understandable to the user. It is to be understood that the present invention is not limited to radiotelephones or other wireless terminals and may also be utilized with a wide variety of other wireless and hard-wired digital communication receivers.

As illustrated in FIG. 2, the baseband processor 60 of the wireless terminal 40 may also include a first cyclic redundancy check ("CRC") circuit 64 that is coupled to the controller/processor 48. This first CRC circuit 64 may be used to add (encode) a series of bits that facilitate detecting if a received data frame includes errors, and to decode the CRC bits included in a receive data frame. Results of the CRC check may be provided to the controller/processor 48 by the first CRC circuit 64. As is also shown in FIG. 2, a first forward error correction ("FEC") circuit 62 is provided that is operatively associated with the transceiver 42, the controller/processor 48 and the memory 44. The first FEC circuit 62 may be used to encode digital data that is to be transmitted over the channel using error correction coding techniques and/or to decode a received digital signal that was encoded prior to transmission. The first FEC circuit 62 is coupled to the first CRC circuit 64. While the forward error correction encoding and the CRC encoding may be done in either order, in one embodiment of the present invention the CRC encoding is performed first, followed by the forward error correction encoding. Thus, at the receiver, the received data is first run through an FEC circuit (to decode the forward error correction encoding) and then through the CRC circuit.

The wireless terminal 40 may also include a second FEC 68 that is coupled to a second CRC circuit 66. The second CRC circuit 66 is coupled to the controller/processor 48, and the results of the CRC check performed by the second CRC circuit 66 may be provided to the controller/processor 48 by the second CRC circuit 66. While FIG. 2 depicts separate boxes for the first FEC circuit 62 and the first CRC circuit 64, those of skill in the art will appreciate that a single circuit and/or software algorithm may be used to implement both the forward error correction and the forward error detection encoding and/or decoding. Likewise, the second FEC circuit 68 and the second CRC circuit 66 may be implemented as a single device/software algorithm or using multiple devices/algorithms.

The present invention is generally described herein in the context of a "communications terminal" or "terminal." As used herein, the term "terminal" may include, among other things, a cellular radiotelephone with or without a multi-line display; a hard-wired telephone, a computer or other processing device that includes a modem or other communications device, a Personal Communications System (PCS) terminal that may combine a cellular radiotelephone with data processing, facsimile and data communications capabilities; and a Personal Data Assistant ("PDA") that can include a radiotelephone, pager, Internet/intranet access, Web browser, organizer, calendar and/or a global positioning system (GPS) receiver.

In embodiments of the present invention, a data frame of a first length which includes an embedded frame of a second length is decoded. Specifically, a data frame is received and examined to detect if the embedded frame is present. If it is, the portion of the received data frame corresponding to the embedded frame may be replaced with a dummy data sequence to provide a modified data frame, and this modified data frame may then be decoded. Otherwise, the received data frame is decoded. In one embodiment, the dummy data sequence is a sequence of zeros the examination of the received data frame to detect the embedded frame may comprise (i) decoding a sub-interval of the received data frame to provide a decoded data stream, (ii) performing an error detection check on the decoded data stream, and then (iii) identifying the sub-interval of the received data frame as an embedded control frame if the error detection check indicates that the decoded data stream is free of errors.

In other embodiments of the invention, the length of the data frame may be an integer multiple of the length of the embedded frame. In these embodiments, the examination of the received data frame to detect the embedded frame may comprise (i) dividing the received data frame into a plurality of non-overlapping sub-intervals that have the length of the embedded frame, (ii) decoding each of the non-overlapping sub-intervals of the received data frame to provide a plurality of decoded data streams, (iii) performing an error detection check on each of the plurality of decoded data streams, and (iv) identifying as the embedded frame the sub-interval of the received data frame, if any, which corresponds to the decoded data stream which the error detection check indicates is free of errors. These embodiments may further comprise performing an error detection check on the decoded data if the received data frame is decoded. If this error detection check indicates the decoded received data frame is free of errors, the decoded received data frame may be provided to the user. Otherwise, the sub-interval of the received data frame having the lowest signal quality may be replaced with a second dummy data sequence to provide a second modified data frame, which may then be decoded. If the decoded data frame is still not free of error even after replacing the sub-interval having the lowest signal quality with dummy data, further improvement can be made by performing the same procedure again with the replacement of the sub-interval having the second lowest signal quality. This can be repeated until all four sub-intervals are exhausted.

In further embodiments of the present invention, instead of replacing the portion of the received data frame that corresponds to the embedded frame with a dummy data sequence, the embedded frame may be removed altogether. These embodiments may be used where the data bearing portion of a data frame that includes an embedded frame was encoded at an increased encoding rate such that the encoded data frame included sufficient extra room for an embedded frame to be included.

In other embodiments of the present invention, a receive terminal determines the length of a data frame contained within a data burst. Pursuant to these embodiments, the receive terminal receives a data burst, and then decodes a portion of the burst having a first length to provide a first decoded data stream. The terminal may then perform an error detection check on the first decoded data stream, and identifies the length of the data frame as the first length if the error detection check on the first decoded data stream indicates that the first decoded data stream is free of errors.

If, on the other hand, errors are present, the terminal decodes another portion of the received data burst that is of a second length to provide a second decoded data stream, and performs an error detection check on the second decoded data stream. The terminal may then identify the length of the data frame as the second length if the error detection check on the second decoded data stream indicates that the second decoded data stream is free of errors.

In yet other embodiments of the present invention, a control message is transmitted as part of a data stream. Pursuant to these embodiments, the control message is configured into a control frame having a first length and the data stream is configured into a plurality of data frames, wherein each of the data frames is of a second length that is greater than the first length. Then, one of the data frames and the control frame may be multiplexed together to create a hybrid frame that is the second length, which may then be transmitted. In these embodiments, the multiplexing may comprise replacing a portion of one of the data frames with the control frame. Alternatively, the multiplexing may comprise multiplexing an encoded data frame and an encoded control frame together by encoding the data frame at an increased encoding rate to leave sufficient room in the encoded frame for the insertion of the encoded control frame. In these embodiments, at least that portion of the hybrid frame that includes data from the data frame may be transmitted at an increased power level.

Figure 3A:
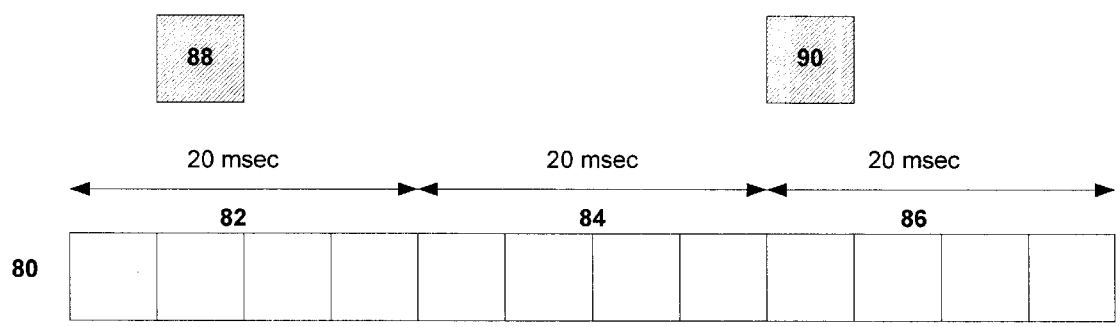
FIG. 3 is a diagram illustrating frame multiplexing techniques according to embodiments of the present invention.

FIG. 3A depicts a portion of a data stream 80 that is to be transmitted over an IS-2000 fundamental channel. As shown in FIG. 3A, the data stream 80 comprises a plurality of data frames 82, 84, 86. Each of the data frames 82, 84, 86 is 20 milliseconds in length. These data frames 82, 84, 86 may be divided into four 5 millisecond sub-portions as indicated in FIG. 3A. As is further shown in FIG. 3A, 5 millisecond control frames 88, 90 may also be created that are intermittently transmitted over the fundamental channel.

Figure 3B:
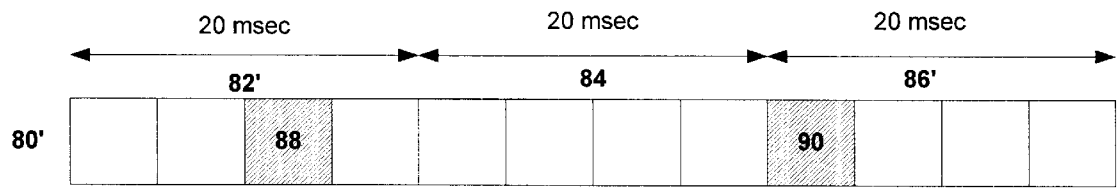

As shown in FIG. 3B, according to embodiments of the present invention, the control frames 88, 90 may be multiplexed into the data stream 80 to create a modified data stream 80' by embedding the control frames 88, 90 into one of the data frames 82, 84, 86 in place of one of the 5 millisecond sub-portions of the data frame. In this manner, one quarter of each data frame that includes a control frame is not transmitted over the channel. Thus, for example, in FIG. 3B control frame 88 is embedded into the third 5 millisecond sub-interval of data frame 82 to create modified data frame 82', and control frame 90 is embedded into the first 5 millisecond sub-interval of data frame 86 to create modified data frame 86'.

In embodiments of the present invention depicted in FIG. 3B, the 5 millisecond control frames 88, 90 are multiplexed into the data stream at the 5 millisecond boundaries of the four sub-portions of the data frames 82, 84, 86. However, it will be understood that the control frames may be multiplexed into the data frames at positions other than at the 5 millisecond boundaries. This alternative approach may be used where the receiver knows, or can determine (e.g., by fluctuations in received signal power or by detecting a series of identifier bits), the location at which a control frame will be embedded within a received data frame.

As noted above, under the IS-2000 air interface, signals are convolutionally encoded and also include CRC bits for error detection. As such, there is at least a possibility that a 20 millisecond data frame which has an embedded control frame such as data frame 82' may be properly reconstructed at the receiver. If such reconstruction may be accomplished, bandwidth may not be wasted in that the channel may constantly transmit data or control frames. Embodiments of the present invention can significantly enhance the probability of accurately reconstructing such a data frame by undertaking certain actions.

Specifically, in some embodiments by using two decoders at the receive terminal, and/or by using progressively sophisticated detection algorithms, a receive terminal can be designed that it is capable of accurately reconstructing data frames which include embedded control frames. With the use of such a receive terminal it is not necessary to replace a data frame (by queuing it for later transmission or by dropping the data frame altogether), and the full bandwidth of the fundamental channel may thus be utilized. Thus, the receive terminals of the present invention may use a first decoder to continuously search specific sub-intervals of each received data burst for control frames, while using a second decoder to decode data bursts in which no control frame was identified. Moreover, embodiments of the receive terminal may also include software or hardware which can be used to modify a received data burst which is identified as including a control frame in such a way as to increase the probability that the whole data frame can be accurately reconstructed, even though only a portion of the data was received at the receive terminal (since a portion was replaced with the control frame).

Operations of the present invention will now be described with respect to the flowchart illustrations of FIGS. 4–8. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instructions for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 4:
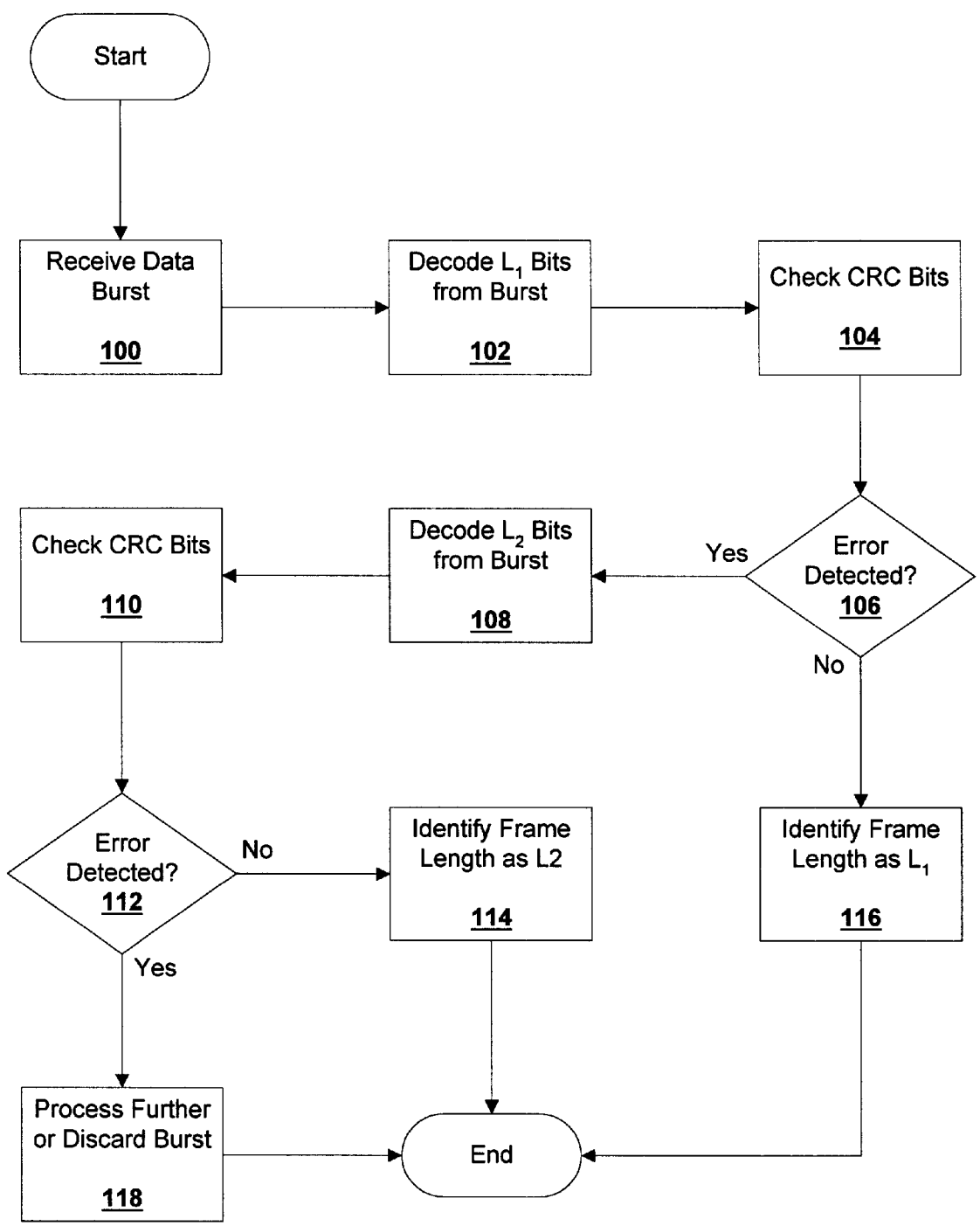
FIG. 4 is a flow chart illustrating operations for determining the length of a received data frame according to embodiments of the present invention.

As noted above, pursuant to embodiments of the present invention, methods and systems are provided for a receiver to determine the length of a data frame contained within a data burst that may include frames of different lengths. Certain embodiments of this aspect of the present invention are depicted in the flow chart of FIG. 4. As shown in FIG. 4, when a wireless terminal or other receiving device receives a data burst (block 100), the terminal proceeds to decode a portion of the burst having a length $L_1$ (block 102). The output of the decoder is then checked for errors via a CRC check or some other form of forward error detection (block 104). If the portion of the data burst is determined to be free of errors (block 106), then the length of the frame is identified as the length $L_1$ (block 116).

If an error is detected in the decoded portion of the data burst (block 106), a second portion of the received data burst having a length $L_2$ is decoded (block 108). The output of the second decoder is then checked for errors via a CRC check or some other form of forward error detection (block 110). If the portion of the received data burst having length $L_2$ is found to be free of errors (block 112), then the length of the frame is identified as the length $L_2$. If at block 112 one or more errors are identified, the data burst may either be discarded (block 118), or subject to additional processing. In certain embodiments of the present invention, the received data burst includes a plurality of fixed length data frames. At least some of these data frames may include a fixed length control frame which is embedded at some location within the data frame. In these embodiments, the length $L_1$ may be set to equal the length of the embedded control frames, and the length $L_2$ may be set to the length of the data frames. In these embodiments at block 102 the receive terminal searches a portion of the received data burst of length $L_1$ where it is expected that an embedded control frame, if one is present, would be located. If the CRC check performed at block 104 indicates that no errors are present, this indicates that an embedded control frame is present in the $L_1$ bit portion of the received data burst.

If the CRC check at block 106 indicates that errors are present, then the receive terminal may proceed to decode a portion of the received data burst that includes a full data frame (i.e., the $L_2$ bits which immediately follow a frame boundary). If the CRC check on this decoded bit stream indicates no errors are present (blocks 110, 112), the receive terminal has identified a data frame which does not include an embedded control frame, and hence the length of the frame is identified as $L_2$ (block 114).

If the control (or other) frames that are of length $L_2$ are always embedded at the same location within a received data frame, then during the operations of FIG. 4 it only may be necessary to decode one portion or "sub-interval" of the received data burst, namely the sub-interval in which the embedded frame will be located if such an embedded frame is present. However, it will be appreciated by those of skill in the art that in other embodiments the embedded frame could be located at a plurality of different locations within the received data burst. In such a situation, additional operations may be added to those depicted in FIG. 4.

For instance, as noted above with respect to FIG. 3B, in a system operating under the IS-2000 air interface, as modified pursuant to embodiments of the present invention, a 5 millisecond control frame could be embedded at any of four locations within a received data frame (i.e., at any of the 5 millisecond boundaries within a given 20 millisecond data frame). Consequently, in such embodiments, the operations depicted in FIG. 4 may be modified such that each of the four 5 millisecond subintervals of each received data frame are decoded and CRC checked, as the control frame could be located at any of these locations. This could be accomplished by repeating the operations of blocks 102, 104, 106 of FIG. 4 for each of the four 5 millisecond sub-intervals of each received data frame. If any of these four decoded data streams was identified as being free of errors, then the receive terminal may identify the received data frame as including an embedded control frame of length $L_1$ (where in this case $L_1$ would be 5 milliseconds). Thus, in these embodiments, the receive terminal can blindly attempts to detect the presence of a 5 millisecond control frame by continuously decoding each 5 millisecond sub-interval of each received data frame, while at the same time decoding an entire 20 millisecond data frame (although not necessarily the same data frame).

It will also be appreciated that while in some embodiments of the present invention the receive terminal first searches for the (smaller length) embedded frame, that the receive terminal may instead check first to see if the received data frame does not include an embedded control frame. This could be done, for example, by setting $L_1$ in the flow chart of FIG. 4 to equal to the length of the data frame and by setting $L_2$ equal to the length of the embedded frame.

The operations of FIG. 4 may be efficiently performed by providing a receive terminal that includes two separate decoders and error detection circuits. In this manner, one of the decoder/CRC circuits may be used to perform the operations of blocks 102, 104, 106 while the second decoder/CRC circuit may be used to perform the operations of blocks 108, 110, 112 of FIG. 4. However, it will also be understood that a single decoder/CRC circuit may be used.

Figure 5:
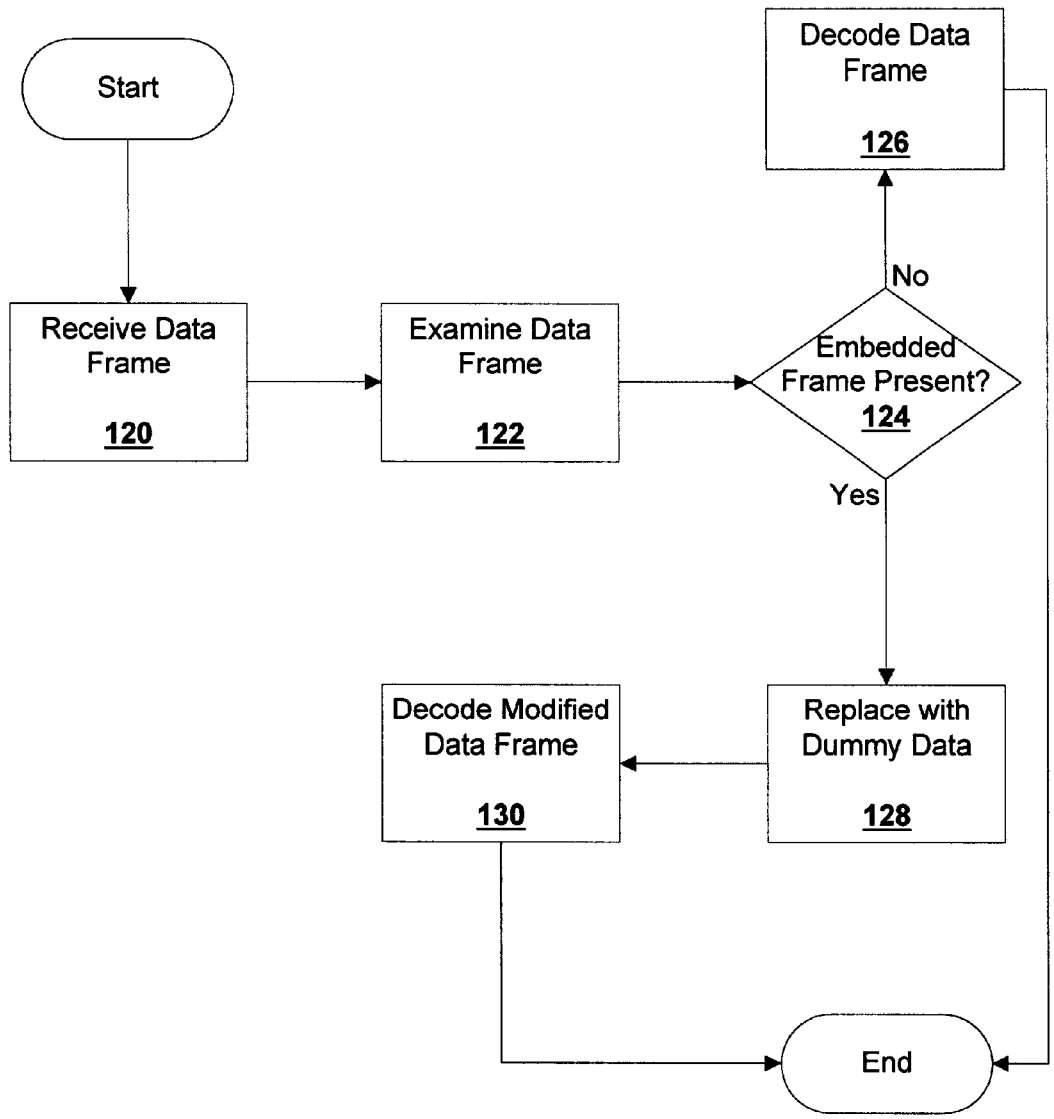
FIG. 5 is a flow chart illustrating operations for decoding a data frame of which includes an embedded control frame according to embodiments of the present invention.

In additional embodiments of the present invention a data frame of a first length is decoded which includes an embedded frame, such as an embedded control frame. The flow chart of FIG. 5 depicts operations by which this may be accomplished pursuant to embodiments of the present invention. As shown in FIG. 5, after receiving a data frame (block 120), at least part of the data frame is examined (block 122) to determine if it includes an embedded frame. If such an embedded frame is not detected (block 124), then the entire received data frame is decoded (block 126). If instead, it is determined that an embedded frame is present in the received data frame (block 124), then that portion of the received data frame that comprises the embedded frame is replaced with a dummy data sequence (block 128). This modified received data frame may then be decoded (block 130).

As will be appreciated by those of skill in the art in light of the present disclosure, in at least many situations a terminal receiving a data frame which includes an embedded control frame will not be able to accurately reconstruct the full data frame, even with the benefit of forward error correction encoding. For example, the embedded frame may act as mis-information during attempts to decode the received data frame. However, if the control frame is replaced with an appropriate dummy data sequence, it may no longer actively serve as mis-information to the decoder. Consequently, by replacing the control frame with a dummy data sequence the probability of correctly reconstructing the full data frame from the partially received data frame may be significantly increased.

By way of example, under the IS-2000 air interface, the transmitted data stream comprises a sequence of modulated bits, where each bit has a value of 1 or −1. The bits which comprise part of the control frame may act as misinformation during attempts to decode the received data stream, as a decoder receiving these bits may believe they comprise helpful information which may be used in the decoding process to correct any errors and reconstruct the original data stream, when in fact, they are essentially a random series of bits which include no information that is helpful in reconstructing the original data frame (i.e., the data frame before it was modified by the insertion of the control frame). Consequently, any reliance by the decoder on the bits that comprise part of the control frame may only serve to decrease the likelihood that the original data frame may be accurately reconstructed.

In an effort to reduce the misinformation that results when the bits of the control frame are decoded, the control frame may be replaced by a series of zeros. In this manner, the control frame bits may no longer act as misinformation, which can significantly increase the probability that the decoder may reconstruct the original data frame. In embodiments of the present invention, the improvement to the probability of correctly reconstructing the original data frame which is provided by replacing the embedded control frame with a dummy data sequence (such as a sequence of zeros) is referred to as the "first level improvement."

Figure 6:
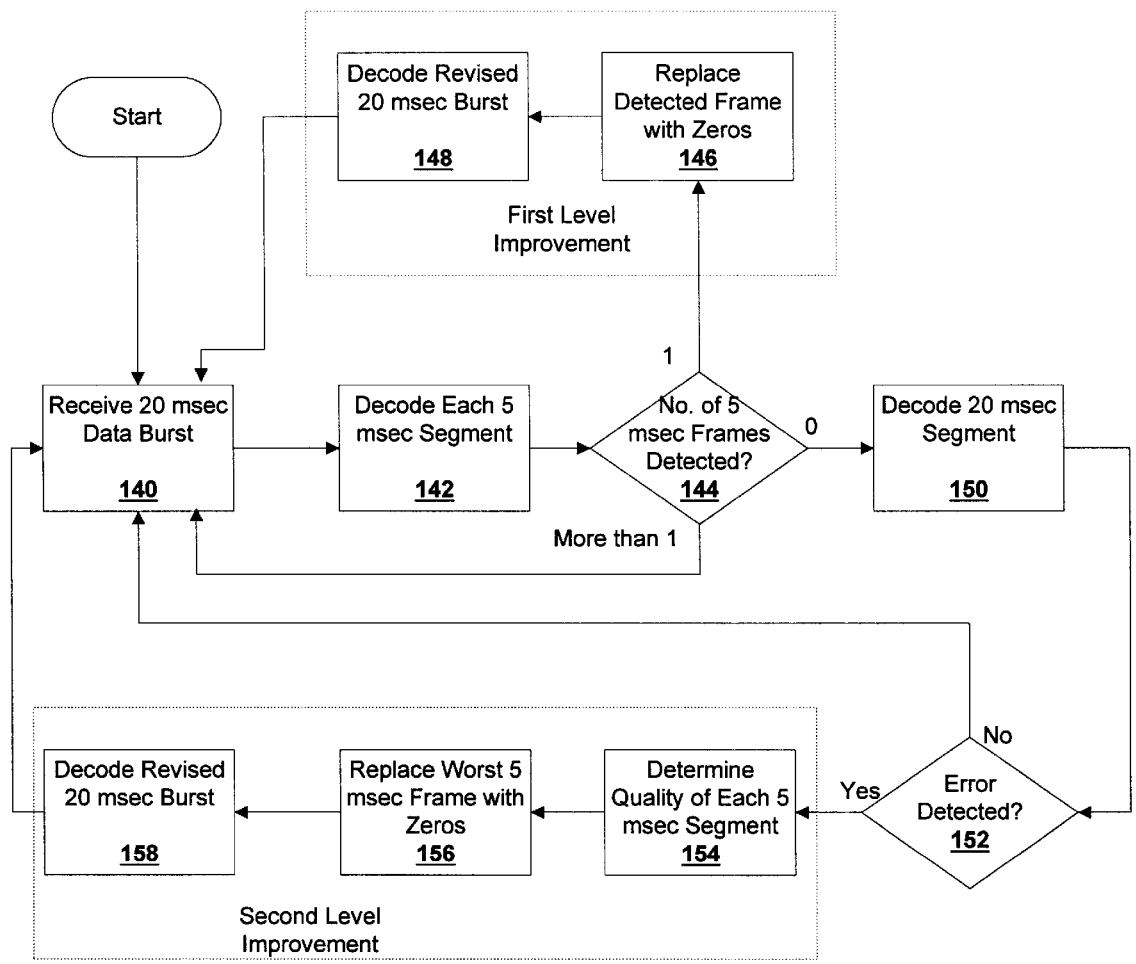
FIG. 6 is a flow chart illustrating operations for decoding a data frame of which includes an embedded control frame according to further embodiments of the present invention.

FIG. 6 depicts an embodiment of the present invention which is tailored to the IS-2000 situation in which 5 millisecond control frames are sent over the fundamental channel of 20 millisecond data frames. As shown in FIG. 6, the operation starts when the receive terminal receives a 20 millisecond data burst (block 140). The receive terminal then decodes each of the four non-overlapping 5 millisecond sub-intervals of this received data burst (block 142). In preferred embodiments of the present invention, the receive terminal has at least two decoders available so that one decoder may be dedicated to decoding each 5 millisecond subinterval of a received data frame, while a second decoder is used to decode the full 20 millisecond frame as discussed below. It will be understood that the two decoders could be integrated into a single device that provides the functionality of two separate decoders.

After the four 5 millisecond sub-intervals of the received data frame have been decoded, the receive terminal determine the number of 5 millisecond control frames which were detected (block 144). This may be accomplished, for example, by performing an error detection check on each of the data streams resulting from the four decoding operations and incrementing a counter each time the error detection check indicates that no errors were found. Those of skill in the art will appreciate that numerous other techniques may be implemented to perform the operation of block 144.

As indicated in FIG. 6, if more than one control frame is detected within the four sub-intervals, the receive terminal may proceed to processing the next received data burst. Such an implementation may be advantageous in systems where at most one control frame will be embedded within any given data frame. In such a situation, a determination at the receiver that two control frames exist is an indication that the received data burst includes a relatively large number of errors (which, for example, may have been introduced via a noisy communications channel). In such a situation, the chances of accurately reconstructing at the receive terminal the full 20 millisecond data frame from the 15 milliseconds of the data frame which were actually transmitted over the channel may be remote (since the error correction coding will be unlikely to overcome both the missing data and the errors introduced during transmission), and thus it may be more efficient for the receive terminal to proceed directly to the next received data burst. Likewise, when more than one control frame is embedded within a data frame (as, for instance, is theoretically allowed under IS-2000), it may also be more efficient to proceed directly to the next frame. This is because the chances of accurately reconstructing the original data frame from only 10 milliseconds of received data may be remote (and hence not worth trying).

If at block 144 only one of the four sub-intervals is identified as comprising an embedded control frame, the control message on that sub-interval is replaced with a series of zeros (block 146) to provide a modified data frame. This modified 20 millisecond data frame may then be decoded in an effort to reconstruct the full data frame (block 148). Moreover, the decoded control frame may also be provided to the processor or controller on the receive terminal (not pictured in FIG. 6). In embodiments of FIG. 6, the operations at blocks 146, 148 comprise the above-mentioned first level of improvement.

If at block 144 no 5 millisecond frames are detected, the receive terminal decodes the full 20 millisecond data frame (block 150). As noted above, this may be performed in a second decoder that is separate from the decoder used to decode the four 5 millisecond sub-intervals of the received data frame. An error detection check may then be performed on this decoded frame (block 152). If no errors are detected, then the decoded data frame may be provided to the end user, and the process starts again at block 140 with the next received data frame. If, however, errors are detected, further processing of the received data frame may be performed which, in some instances, may allow for accurate reconstruction of the data frame.

Specifically, there may be situations where a control frame is embedded in a data frame, but is not detected during the operations of block 144 of FIG. 6. Through simulation it may be shown that such a situation is most likely to arise when the quality of the communications channel was significantly degraded during the transmission of the 5 millisecond control frame. In light of the above, in situations where the receive terminal is unable to (i) detect a control frame or (ii) correctly decode the data frame, it may be advantageous to assume that a control frame was sent during the one of the four sub-intervals which has the worst signal quality. The quality of the received signal may be evaluated using any of a number of receive signal performance measures, such as the measured signal to interference ratio at the receiver averaged over each 5 millisecond sub-interval. Such measurements may be available in conventional receiver designs. Based on this assumption, operations similar to those shown in blocks 146 and 148 may be performed to increase the probability of accurately reconstructing the 20 millisecond data frame. In embodiments of FIG. 6, these operations, which are shown at blocks 154, 156, 158 of FIG. 6, are referred to as the "second level improvement."

As shown in FIG. 6, upon determining at block 152 that the decoded received data frame contains errors, the receive terminal makes a determination as to which of the 5 millisecond sub-intervals of the received data frame has the worst signal quality (block 154). The data for this sub-interval may then be replaced with a dummy data sequence, which in embodiments of FIG. 6 is a series of zeros, to provide a modified received data frame (block 156). The modified received data frame may then be decoded (block 158), typically using the second decoder. The process then starts anew with the next received data frame (block 140).

As shown, for example, in FIG. 6, in various embodiments of the present invention the first and second decoders may not operate in parallel. Instead one of the two decoders first operates on the received data frame. In embodiments of FIG. 6, the first decoder is initially run to decode the 5 millisecond sub-intervals of the received data frame. Thereafter, the 20 millisecond decoder is run to decode the received data frame. It will be understood, however, that in other embodiments of the present invention the two decoders may operate on the same data burst simultaneously, or, the 20 millisecond decoder may operate on the received data burst before the 5 millisecond decoder.

Figure 7:
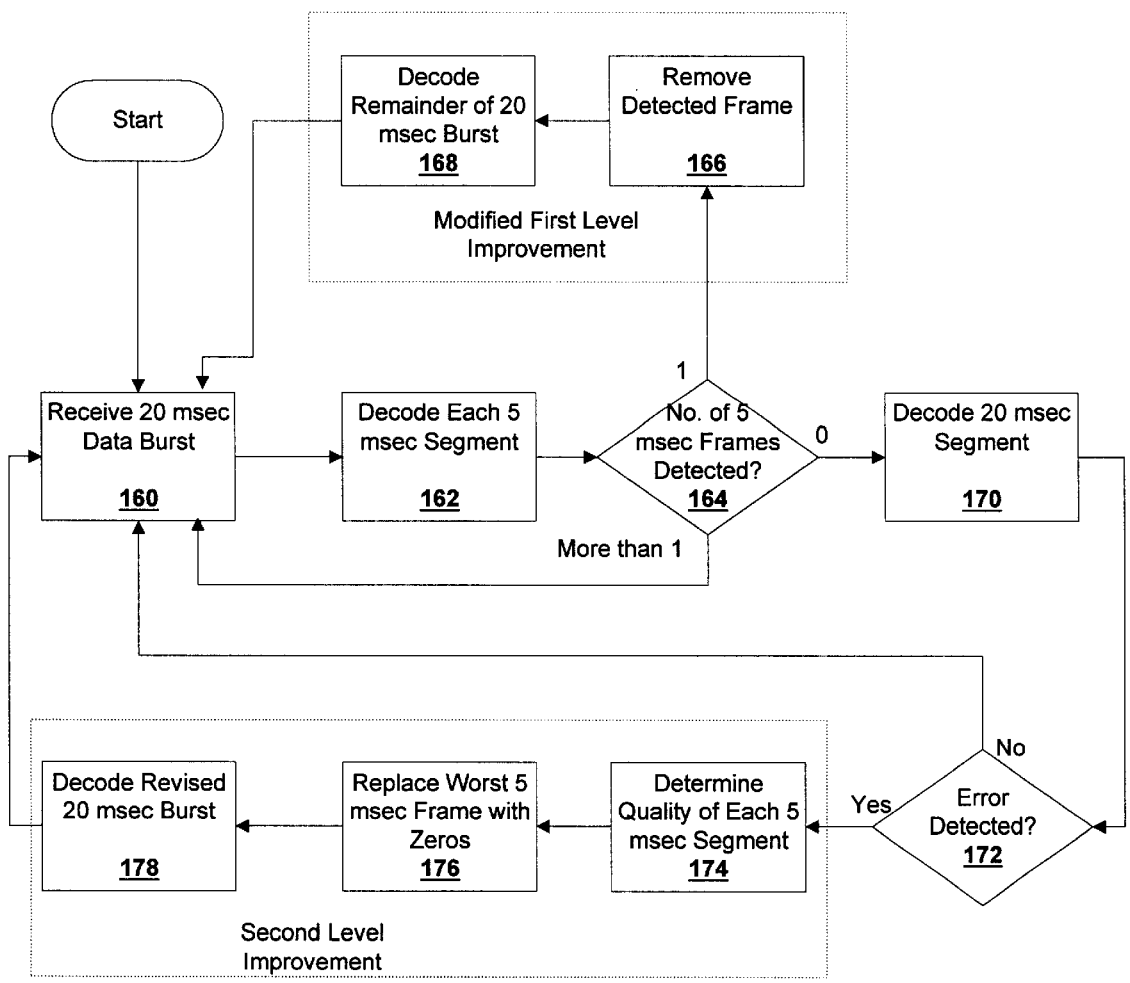
FIG. 7 is a flow chart illustrating operations for decoding a data frame of which includes an embedded control frame according to additional embodiments of the present invention.

FIG. 7 is a flow chart depicting additional embodiments of the present invention, in which a modified implementation of the first level improvement is provided. As shown in FIG. 7, operations start when the receive terminal receives a 20 millisecond data burst (block 160). The receive terminal then decodes each of the four non-overlapping 5 millisecond sub-intervals of this received data burst (block 162). After the four 5 millisecond sub-intervals of the received data frame have been decoded, the receive terminal determines the number of 5 millisecond control frames which were detected (block 164).

As indicated in FIG. 7, if more than one control frame is detected within the four sub-intervals, the receive terminal may proceed to processing the next received data burst. If at block 164 only one of the four sub-intervals is identified as comprising an embedded control frame, the receive terminal removes the embedded frame that was detected (block 166). The receive terminal may then decode the portion of the 20 millisecond burst which remains (block 168), which is that portion that corresponds to the encoded data frame that was transmitted. The process then starts over again with the next received data frame at block 160.

Embodiments depicted in FIG. 7 may be used in situations where the data frames which are to include an embedded control frame are processed differently prior to transmission. Specifically, as discussed herein, the data frames which are to include an embedded control frame may be encoded at an increased encoding rate (e.g., ⅔ rate instead of ½ rate encoding) so that the encoded data frame is sufficiently smaller than the length of a regular encoded data frame that a control frame may be embedded without overwriting or replacing any of the encoded data frame. When such an encoding scheme is used, the embedded frame need only be removed from the received frame (and processed independently), as opposed to the replacement operation in which a dummy data sequence is inserted as discussed with respect to the embodiments of FIG. 6.

If at block 164 no 5 millisecond frames are detected, the operations continue with blocks 170, 172, 174, 176, 178, which are identical to blocks 150, 152, 154, 156, 158 of FIG. 6, which are described above.

Figure 8:
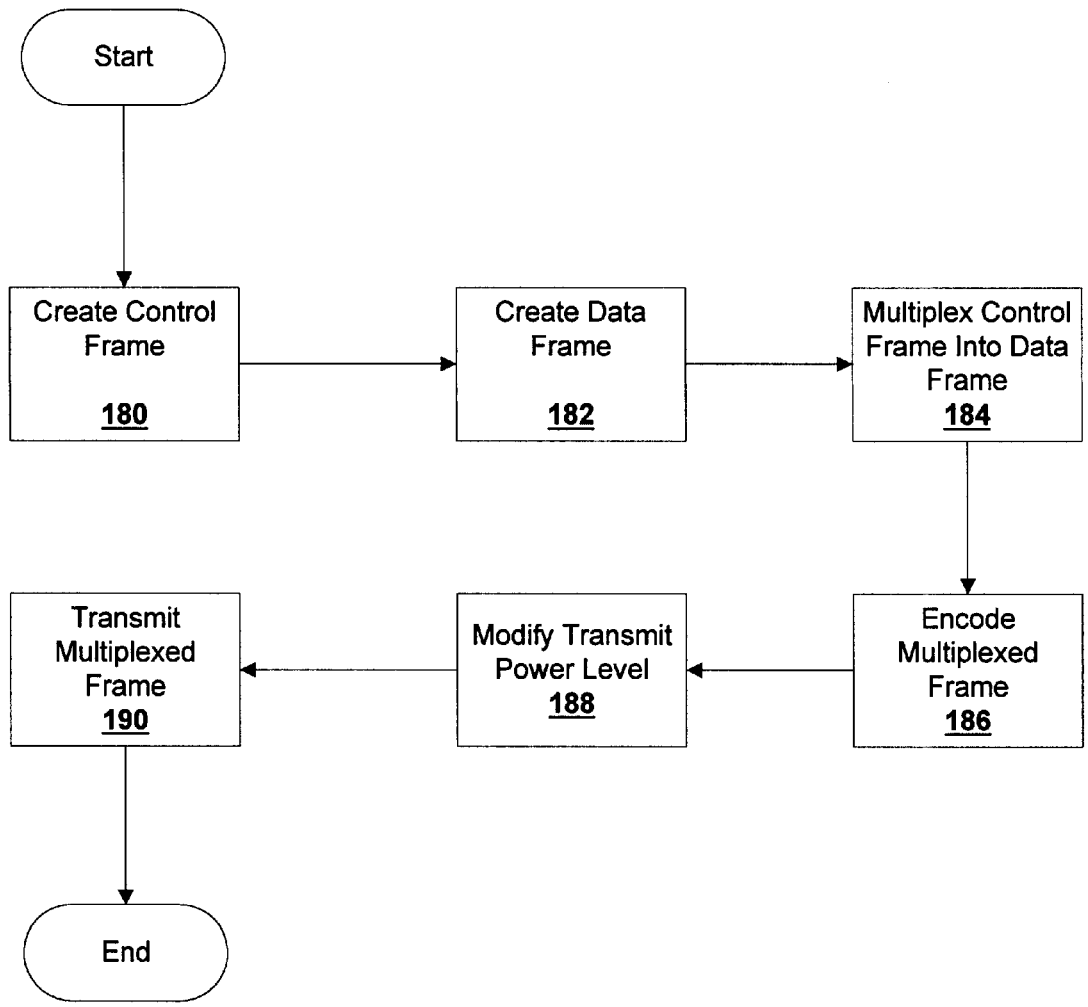
FIG. 8 is a flow chart illustrating operations for integrating a control message into a data frame according to embodiments of the present invention.

As noted above with respect to FIGS. 3A and 3B, embodiments of the invention can integrate a control message into a data stream and transmit the control message. FIG. 8 is a flow chart illustrating such embodiments of the present invention. As shown in FIG. 8, the control message is first configured into a control frame (block 180). Either before, after and/or during the configuration of the control frame, the data that is to be transmitted is likewise configured into a plurality of data frames (block 182). Each of these data frames may be of a first length, and the control frame may be of a second length which is less than the first length. The control frame may then be multiplexed into one of the data frames by replacing a portion of the data frame with the control frame (block 184), as is illustrated in FIGS. 3A and 3B. This results in a hybrid frame that includes both the control frame and part of the data frame.

The hybrid data frame may then be encoded using error correction coding techniques which are well known to those of skill in the art. In embodiments of the present invention, this may be accomplished by encoding the portions of the hybrid frame which correspond to the original data frame independently of the portion of the hybrid frame that corresponds to the control frame. For example, in an IS-2000 communications system in which the data frames are encoded using a rate ½ convolutional code, the 20 millisecond data frame could be convolutionally encoded using a rate ⅔ encoder. The remaining portion of the hybrid frame could then be independently encoded using a rate ½ convolutional encoder. In this manner, the original data frame is encoded into a 15 millisecond portion of the hybrid frame, so that no coding information is lost as 5 milliseconds of the hybrid frame are left over for the control frame. At the receive terminal, these data bits may then be decoded by identifying the embedded control frame and removing it from the received data frame as discussed above with respect to FIG. 7.

After the hybrid frame has been encoded (block 186), the transmit terminal may optionally perform power balancing operations to increase the probability that the hybrid frame will be accurately decoded at the receiver (block 188). Pursuant to embodiments of the present invention, the transmit power may be increased during the transmission of at least those portions of each hybrid frame which correspond to the original data frame. In this manner, the probability that channel interference may prevent accurate reconstruction of the received data frame may decrease. However, the impact of this increased transmit power levels on the overall communications system may be minimal since only a portion of occasional frames have the increased power levels. Alternatively, every hybrid frame could be transmitted at a higher power level. This may increase the potential interference slightly (since the terminal would be transmitting at a higher power level 33% more often), but also may advantageously reduce the error rate on control frames.

The flowcharts of FIGS. 4 through 8 illustrate the architecture, functionality, and operation of possible implementations of methods and systems according to the present invention. In this regard, each block in the flow charts represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

EXAMPLE

A simulation was performed in which 4000 20 millisecond data frames were randomly generated. For each of these data frames, the first 5 milliseconds of data was replaced with a control frame containing a randomly generated control message. The 4000 data frames were then run through a baseband channel simulation which simulated radio configuration 4 under the IS-2000 air interface. The channel was modeled as a 2-tap fading channel, and the 4000 data frames were modeled as being transmitted over this channel at 9600 bits per second. Each data frame was encrypted, cyclic redundancy encoded, convolutionally encoded, interleaved, spread, filtered and modulated prior to its simulated transmission consistent with the IS-2000 air interface specification. The reverse processes were carried out at the receiver. The following three scenarios were simulated: (i) the frames were not modified at the receiver; (ii) each frame was modified at the receiver consistent with the first level improvement discussed above; and (iii) each frame was modified at the receiver consistent with the second level improvement discussed above.

Figure 9:
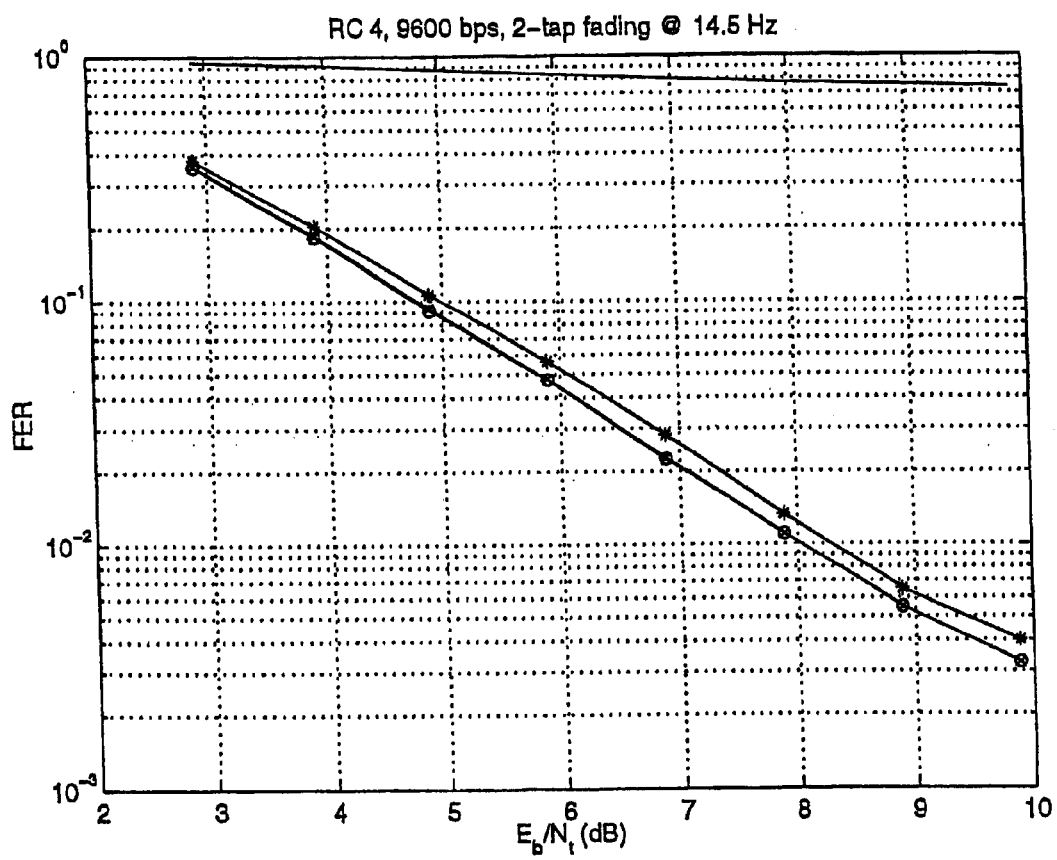
FIG. 9 is a graph depicting simulation results indicating the performance improvements provided by embodiments of the present invention.

FIG. 9 depicts the probabilities of correctly receiving a data frame which includes an embedded control frame at the receive terminal, as indicated in the above-referenced simulation, for the three separate scenarios. The solid (uppermost) line in FIG. 9 graphs the frame error rate as a function of the bit energy ($E_b$) to noise ($N_t$) ratio for the case where the receive terminal attempts to reconstruct the data frames (each of which include an embedded control frame) as received. As indicated in FIG. 9, even at high $E_b/N_t$ levels the frame error rates is poor. The line connecting the stars in FIG. 9 (the middle line) depicts the simulated frame error rate for the case where in each data burst in which a control frame was identified the portion of the burst corresponding to the control frame is replaced with a series of zeros (i.e., when the first level of improvement is added). As shown in FIG. 9, this results in a significant improvement in the frame error rate, with only about one in one hundred frames being erroneously decoded at $E_b/N_t$ levels of just over 8 dB.

Finally, the line connecting the crosses in FIG. 9 (the lowermost line) depicts the simulated frame error rate for the case where both the first and second level improvements are implemented. As shown in FIG. 9, this results in even further improvement in the frame error rate, and in fact, almost exactly coincides with the ideal case where perfect detection of the 5 millisecond frame is assumed.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for decoding a data frame which includes an embedded frame, the method comprising:

receiving the data frame;

attempting to detect the embedded frame; and then
if the embedded frame is detected, replacing a portion of the received data frame corresponding to at least a portion of the embedded frame with a dummy data sequence to provide a modified data frame, and then decoding the modified data frame; and
if the embedded frame is not detected, decoding the received data frame.

2. The method of claim 1, wherein attempting to detect the embedded frame comprises:

decoding a sub-interval of the received data frame to provide a decoded data stream;

performing an error detection check on the decoded data stream; and identifying the sub-interval of the received data frame as an embedded frame if the error detection check indicates that the decoded data stream is free of errors.

3. The method of claim 2, wherein the data frame has a first length and the embedded frame has a second length, and wherein the sub-interval of the received data frame has a length equal to the second length.

4. The method of claim 1, wherein the data frame has a first length and the embedded frame has a second length, wherein the first length is an integer multiple of the second length, wherein the sub-interval of the received data frame has a length equal to the second length, and wherein attempting to detect the embedded frame comprises:

dividing the received data frame into a plurality of non-overlapping sub-intervals, each of which has a length equal to the second length;

decoding each of the non-overlapping sub-intervals of the received data frame to provide a plurality of decoded data streams;

performing an error detection check on each of the plurality of decoded data streams; and identifying as the embedded frame the sub-interval of the received data frame which corresponds to the decoded data stream which the error detection check indicates is free of errors.

5. The method of claim 4, wherein the dummy data sequence comprises a sequence of zeros.

6. The method of claim 4, wherein the method further comprises: if the received data frame is decoded, performing an error detection check on the decoded data; and replacing the sub-interval of the received data frame having the lowest signal quality with a second dummy data sequence to provide a second modified data frame and decoding the second modified data frame if an error is detected in the error detection check on the decoded data.

7. The method of claim 6, wherein the sub-interval of the data frame having the lowest signal quality is the sub-interval having the lowest average signal to-noise ratio.

8. The method of claim 4, wherein a first decoder is used to decode portions of the received data frame which are of the first length, and wherein a second decoder is used to decode portions of the received data frame which are of the second length.

9. A method for decoding a data frame which includes an embedded frame, the method comprising:
receiving the data frame;
attempting to detect the embedded frame; and then
    if the embedded frame is detected, removing the embedded frame from the received data frame to provide a modified data frame, and then decoding the modified data frame; and
    if the embedded frame is not detected, decoding the received data frame.

10. The method of claim 9, wherein the method is repeated for a plurality of received data frames, and wherein the method further comprises decoding each modified data frame at a first decoder rate and decoding each received data frame at a second decoder rate, wherein the first and second decoder rates are different.

11. The method of claim 9, wherein attempting to detect the embedded frame comprises:
decoding a sub-interval of the received data frame to provide a decoded data stream;
performing an error detection check on the decoded data stream; and
identifying the sub-interval of the received data frame as an embedded control frame if the error detection check indicates that the decoded data stream is free of errors.

12. The method of claim 9, wherein the data frame has a first length and the embedded frame has a second length, wherein the first length is an integer multiple of the second length, and wherein attempting to detect the embedded frame comprises:
dividing the received data frame into a plurality of non-overlapping sub-intervals, each of which have a length equal to the second length;
decoding each of the non-overlapping sub-intervals of the received data frame to provide a plurality of decoded data streams;
performing an error detection check on each of the plurality of decoded data streams; and
identifying as the embedded frame the sub-interval of the received data frame which corresponds to the decoded data stream which the error detection check indicates is free of errors.

13. The method of claim 9, wherein the method further comprises:
if the received data frame is decoded, performing an error detection check on the decoded data; and
replacing the sub-interval of the received data frame having the lowest signal quality with a second dummy data sequence to provide a second modified data frame and decoding the second modified data frame if an error is detected in the error detection check on the decoded data.

14. The method of claim 12, wherein a first decoder is used to decode portions of the received data frame which are of the first length, and wherein a second decoder is used to decode portions of the received data frame which are of the second length.

15. A method to determine a length of a data frame contained within a data burst, the method comprising:
receiving the data burst;
decoding a portion of the received data burst having a first length to provide a first decoded data stream;
performing an error detection check on the first decoded data stream; and
identifying the length of the data frame as the first length if the error detection check on the first decoded data stream indicates that the first decoded data stream is free of errors;
decoding a portion of the received data burst having a second length to provide a second decoded data stream, wherein the second length is different than the first length;
performing an error detection check on the second decoded data stream; and
identifying the length of the data frame as the second length if the error detection check on the second decoded data stream indicates that the second decoded data stream is free of errors.

16. The method of claim 15, wherein a first decoder is used to decode the portion of the received data burst having the first length, and wherein a second decoder is used to decode the portion of the received burst having the second length.

17. The method of claim 16, wherein the second length is an integer multiple of the first length, and wherein the second length comprises the length of one data frame.

18. The method of claim 17, wherein the method further comprises:
dividing the received data burst into an integer number of non-overlapping sub-intervals of the second length, wherein the portion of the received data burst decoded by the second decoder comprises one of the non-overlapping intervals;
decoding each remaining non-overlapping sub-interval of the second length of the received data burst using the second decoder to provide a plurality of additional decoded data streams;
performing an error detection check on each of the plurality of additional decoded data streams; and
identifying the length of the data frame as the second length if the error detection check on any of the plurality of additional decoded data streams indicates that one of the plurality of additional data streams is free of errors.

19. A method for transmitting a control message as part of a data stream, the method comprising:
configuring the control message into a control frame having a first length;
configuring the data stream into a plurality of data frames, wherein each of the data frames is of a second length that is greater than the first length; and
multiplexing one of the data frames and the control frame to create a hybrid frame that is the second length; and then
transmitting the hybrid frame.

20. The method of claim 19, wherein multiplexing one of the data frames and the control frame to create a hybrid frame comprises replacing a portion of one of the data frames with the control frame to create a hybrid frame that includes both the control frame and part of the data frame.

21. The method of claim 20, wherein the method further comprises encoding the hybrid frame prior to transmission.

22. The method of claim 21, wherein encoding the hybrid frame comprises:
encoding the one of the data frames at a first encoding rate;
encoding the control frame at a second encoding rate that is different than the first encoding rate; and
wherein multiplexing one of the data frames and the control frame to create a hybrid frame comprises combining the encoded one of the data frames and the encoded control frame to create the hybrid frame.

23. The method of claim 19, wherein the method further comprises transmitting at least that portion of the hybrid frame that includes data from the data frame at an increased power level.

24. The method of claim 20, wherein the method further comprises discarding the portion of the one of the data frames that was replaced with the control frame.

25. The method of claim 24, wherein the second length is an integer multiple of the first length such that each data frame comprises an integer number of non-overlapping sub-portions of the first length, and wherein the portion of the one of the data frames that is replaced with the control frame is one of the integer non overlapping sub-portions of the first length.

26. The method of claim 24, wherein the portion of the one of the data frames that is replaced with the control frame is the first portion of the data frame.

27. A communications terminal for receiving data frames having a first length and embedded control frames having a second length, the terminal comprising:
a transmitter;
a receiver having a first decoder and a second decoder;
a user interface coupled to the transmitter and the receiver;
wherein the first decoder is configured to decode the data frames and the second decoder is configured to decode the control frames.

28. The terminal of claim 27, wherein the first length is an integer multiple of the second length, and wherein the second decoder is configured to decode each non-overlapping sub-interval of the second length of each received data frame.

29. The terminal of claim 28, wherein the terminal further comprises a first error detection circuit coupled to the first decoder.

30. The terminal of claim 29, wherein the terminal further comprises a second error detection circuit coupled to the second decoder.

31. The terminal of claim 30, wherein the terminal further comprises means for replacing the portion of a received data frame corresponding to the embedded control frame with a dummy data sequence.

32. The terminal of claim 30, wherein the receiver is configured to measure the signal quality of non-overlapping sub-intervals of the received data frame, and wherein the terminal further comprises means for replacing the sub-intervals the received data frame having the worst signal quality with a dummy data sequence.

33. A terminal for decoding a data frame of a first length which includes an embedded control frame of a second length comprising:
a first decoder circuit configured to decode the data frame;
a first error detection circuit coupled to the first decoder;
a second decoder, wherein the second decoder is configured to decode each of a plurality non-overlapping sub-intervals of the data frame to provide a plurality of decoded data streams, wherein each of the sub-intervals has a length equal to the second length; and
a second error detection circuit coupled to the second decoder for determining which of the plurality of non-overlapping sub-intervals of the data frame include errors.

34. The terminal of claim 33, wherein the terminal further comprises a processing circuit for replacing the data contained within one of the plurality of non-overlapping sub-intervals of the data frame with a dummy data sequence.

35. The terminal of claim 34, wherein the processing circuit is responsive to the second error detection circuit, and wherein the one of the plurality of non-overlapping sub-intervals of the data frame that is replaced with a dummy data sequence is the sub-interval for which the second error detection circuit indicates is free of errors.

36. The terminal of claim 35, wherein the terminal further comprises a counter circuit for counting the number of the plurality of non-overlapping subintervals of the data frame within a data frame that include errors, and wherein if more than one of the plurality of non-overlapping sub-intervals of the data frame include errors, the data frame is discarded by the terminal.

37. The terminal of claim 34, wherein the data frame is processed by the first decoder if the second error detection circuit indicates that none of the plurality of non-overlapping sub-intervals of the data frame include errors.

38. The terminal of claim 37, wherein the terminal further comprises:
means for identifying the non-overlapping sub-intervals of the data frame that has the worst signal quality; and
a processing circuit for replacing the data contained within one of the plurality of non-overlapping sub-intervals of the data frame with a dummy data; and
wherein after the data frame is processed by the first decoder the resulting data stream is checked for errors by the first error detection circuit, and wherein if an error is found, the processing circuit is used to replace the data contained within the non-overlapping sub-interval of the data frame that has the worst signal quality with a dummy data sequence.

39. A system for decoding a data frame which includes an embedded frame, the system comprising:
a receiver;
a detection circuit for attempting to detect the embedded frame;
a circuit for removing the embedded frame from the received data frame to provide a modified data frame if the embedded frame is detected;
a decoder circuit for decoding one of the modified data frame and the received data frame.

40. The system of claim 39, wherein the decoder circuit operates on modified data frames at a first decoder rate and operates on received data frames at a second decoder rate that is different from the first decoder rate.

41. The system of claim 39, wherein the detection circuit for attempting to detect the embedded frame decodes a sub-interval of the received data frame to provide a decoded data stream, performs an error detection check on the decoded data stream; and identifies the sub-interval of the received data frame as an embedded control frame if the error detection check indicates that the decoded data stream is free of errors.

42. The system of claim 39, wherein the data frame has a first length and the embedded frame has a second length, wherein the first length is an integer multiple of the second length, and wherein the detection circuit for attempting to detect the embedded frame decodes divides the received data frame into a plurality of non-overlapping sub-intervals, each of which have a length equal to the second length, decodes each of the non-overlapping sub-intervals of the received data frame to provide a plurality of decoded data streams, performs an error detection check on each of the plurality of decoded data streams; and identifies as the embedded frame the sub-interval of the received data frame which corresponds to the decoded data stream which the error detection check indicates is free of errors.

* * * * *